United States Patent
Kato

(10) Patent No.: US 9,846,654 B2
(45) Date of Patent: Dec. 19, 2017

(54) STORAGE APPARATUS, CACHE CONTROL METHOD, AND COMPUTER-READABLE RECORDING MEDIUM HAVING CACHE CONTROL PROGRAM RECORDED THEREON

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 356 days.

(21) Appl. No.: 14/633,289

(22) Filed: Feb. 27, 2015

(65) Prior Publication Data

US 2015/0269078 A1    Sep. 24, 2015

(30) Foreign Application Priority Data

Mar. 18, 2014 (JP) ................. 2014-055034

(51) Int. Cl.
*G06F 12/08* (2016.01)
*G06F 12/12* (2016.01)
(Continued)

(52) U.S. Cl.
CPC .......... *G06F 12/12* (2013.01); *G06F 12/0804* (2013.01); *G06F 12/0871* (2013.01);
(Continued)

(58) Field of Classification Search
CPC .. G06F 12/12; G06F 12/0804; G06F 12/0871; G06F 12/121
(Continued)

(56) References Cited

U.S. PATENT DOCUMENTS 8,074,014 B2 * 12/2011 Narayanan ............ G06F 1/3203
711/112
8,122,217 B2 * 2/2012 Naor ..................... G06F 1/3203
711/154
(Continued)

FOREIGN PATENT DOCUMENTS

JP    H04-148225 A    5/1992
JP    H08-063397 A    3/1996
(Continued)

OTHER PUBLICATIONS

Dushyanth Narayanan et al., "Write Off-Loading: Practical Power Management for Enterprise Storage", Fast '08: 6th USENIX Conference on File and Storage Technologies, p. 253-267; Feb. 26-29, 2008 (15 pages).
(Continued)

*Primary Examiner* — Stephen Elmore
(74) *Attorney, Agent, or Firm* — Fujitsu Patent Center

(57) ABSTRACT

A storage apparatus includes: a first storage device that stores data; a proxy storage processor that records first data in the first storage device in a power-off state of a second storage device, while a writing destination of the first data is the second storage device, and moves the first data to the second storage device after the second power storage is powered on, while the first data is recorded in the first storage device; and a cache releaser that deletes the first data from a cache memory after the proxy storage processor stores the first data in the second storage device, while the first data is recorded in the first storage device, so that it is possible to efficiently use the cache memory.

9 Claims, 9 Drawing Sheets

(51) Int. Cl.
  *G06F 12/0804*  (2016.01)
  *G06F 12/0871*  (2016.01)
  *G06F 12/121*  (2016.01)
  *G06F 12/123*  (2016.01)
(52) U.S. Cl.
  CPC .......... *G06F 12/121* (2013.01); *G06F 12/123* (2013.01); *G06F 2212/1044* (2013.01); *G06F 2212/311* (2013.01); *Y02B 60/1225* (2013.01)
(58) Field of Classification Search
  USPC ................................ 711/135, 143, 154, 156
  See application file for complete search history.

(56) References Cited

U.S. PATENT DOCUMENTS

| | | | |
|---|---|---|---|
| 8,868,863 B2* | 10/2014 | Puttaswamy Naga | G06F 17/302 711/154 |
| 2007/0204119 A1 | 8/2007 | Murotani et al. | |
| 2015/0095572 A1 | 4/2015 | Koike | |
| 2015/0268869 A1* | 9/2015 | Kato | G06F 3/0613 711/155 |
| 2015/0278018 A1* | 10/2015 | Kato | G06F 11/1076 714/764 |

FOREIGN PATENT DOCUMENTS

| | | |
|---|---|---|
| JP | H11-288387 A | 10/1999 |
| JP | 2002-268943 A | 9/2002 |
| JP | 2007-226596 A | 9/2007 |
| WO | 2014/002160 A1 | 1/2014 |

OTHER PUBLICATIONS

Japanese Office Action dated Sep. 5, 2017 for corresponding Japanese Patent Application No. 2014-055034, with Partial English Translation, 7 pages.

* cited by examiner

FIG. 7

| WHAT IS OUTPUTTED FROM CACHE? / WHAT IS INPUTTED TO CACHE? | ONLOAD DATA | OFFLOAD DATA | NOTHING |
|---|---|---|---|
| ONLOAD DATA | AS-IS | −1 | AS-IS |
| OFFLOAD DATA | +1 | AS-IS | +1 |

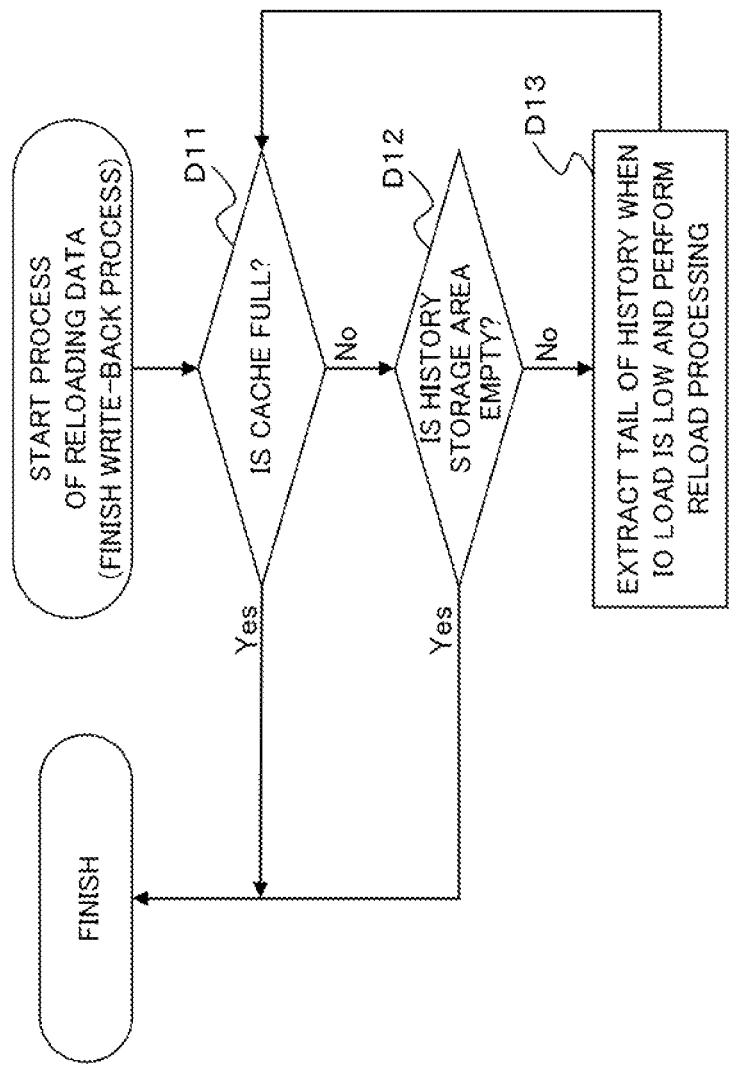

STORAGE APPARATUS, CACHE CONTROL METHOD, AND COMPUTER-READABLE RECORDING MEDIUM HAVING CACHE CONTROL PROGRAM RECORDED THEREON

CROSS-REFERENCE TO RELATED APPLICATION

This application is based upon and claims the benefit of priority of the prior Japanese Patent application No. 2014-055034, filed on Mar. 18, 2014, the entire contents of which are incorporated herein by reference.

FIELD

The embodiment discussed herein is related to a storage apparatus, a cache control method, and a cache control program.

BACKGROUND

Generally, a storage apparatus has a cache mechanism mounted thereon to improve performance thereof. The cache mechanism is a mechanism which arranges (caches) data which is frequently used or data which has temporal locality, and hides a high latency of reading and writing from and in a HDD (Hard Disk Drive). This cache mechanism uses characteristics that an access latency from a CPU (Central Processing Unit) to a memory is remarkably low compared to reading and writing from and in the HDD.

Recently, in a storage field, big data is actively researched and developed as a keyword. A total capacity of a big data storage reaches several tens to several hundreds of PBs (petabyte) and is said to reach 1 EB (Exabyte) in near future.

TOC (Total Cost of Ownership) is becoming a problem. When, for example, a SAS (Serial Attached SCSI (Small Computer System Interface)) drive of 1 TB (terabyte) is used to incorporate a system having a total capacity of 1 EB, 1,000,000 drives are required and electricity cost goes up to several hundred thousand dollars per month.

It is indispensable to power off power sources of the drives to reduce this enormous electricity cost. However, even though the power sources of the drives are powered off, it is necessary to power on the drives when data is read and written from and in the drives. Hence, there are some cases where a drive is carelessly activated in response to a user's request and, as a result, reduction in electricity cannot be achieved.

A method called write off-loading is known as a method of reducing a power consumption amount of such a storage apparatus.

According to the write off-loading, when data is written in a drive which is powered off, data is written (offloaded) to a data storage area (log area) which is not used in another drive which is powered on. Further, when the original writing destination drive which is powered off is powered on, the offloaded data is written in (written back to) this drive.

Consequently, it is not necessary to unnecessarily awake the drive even when writing data in a drive which is powered off is requested, and it is possible to reduce power consumption.

However, in such a conventional storage system, when offloaded data is written back, the written-back data is no longer used in the write-back source drive and does not deserve being cached.

That is, immediately after data is written back in the write-back source drive, worthless data having an offloaded data size is stored in a cache. Therefore, there is a problem that the conventional storage system cannot efficiently use a cache area after offload data is written back.

SUMMARY

According to an aspect of the embodiment, the storage apparatus includes: a proxy storage processor that records first data in a first storage device in a power-off state of a second storage device, while a writing destination of the first data is the second storage device, and moves the first data to the second storage device after the second power storage is powered on, while the first data is recorded in the first storage device; and a cache releaser that deletes the first data from a cache memory after the proxy storage processor stores the first data in the second storage device, while the first data is recorded in the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a view illustrating an algorithm of calculating an allowable size in the storage system according to the example of the embodiment;

FIG. 9 is a flowchart for explaining a process of reloading onload data to a cache area in the reloading processor of the storage system according to the example of the embodiment.

DESCRIPTION OF EMBODIMENT(S)

A storage apparatus, a cache control method and a cache control program according to the embodiment will be described below with reference to the drawings. Meanwhile, the following embodiment is only exemplary, and do not intend to exclude various modified examples and application of techniques which will not be described in the embodiment. That is, the present embodiment can be variously carried out without departing from the spirit of the present embodiment. Further, each drawing means that only components illustrated in each drawing are provided and can include other functions and the like.

Figure 1:
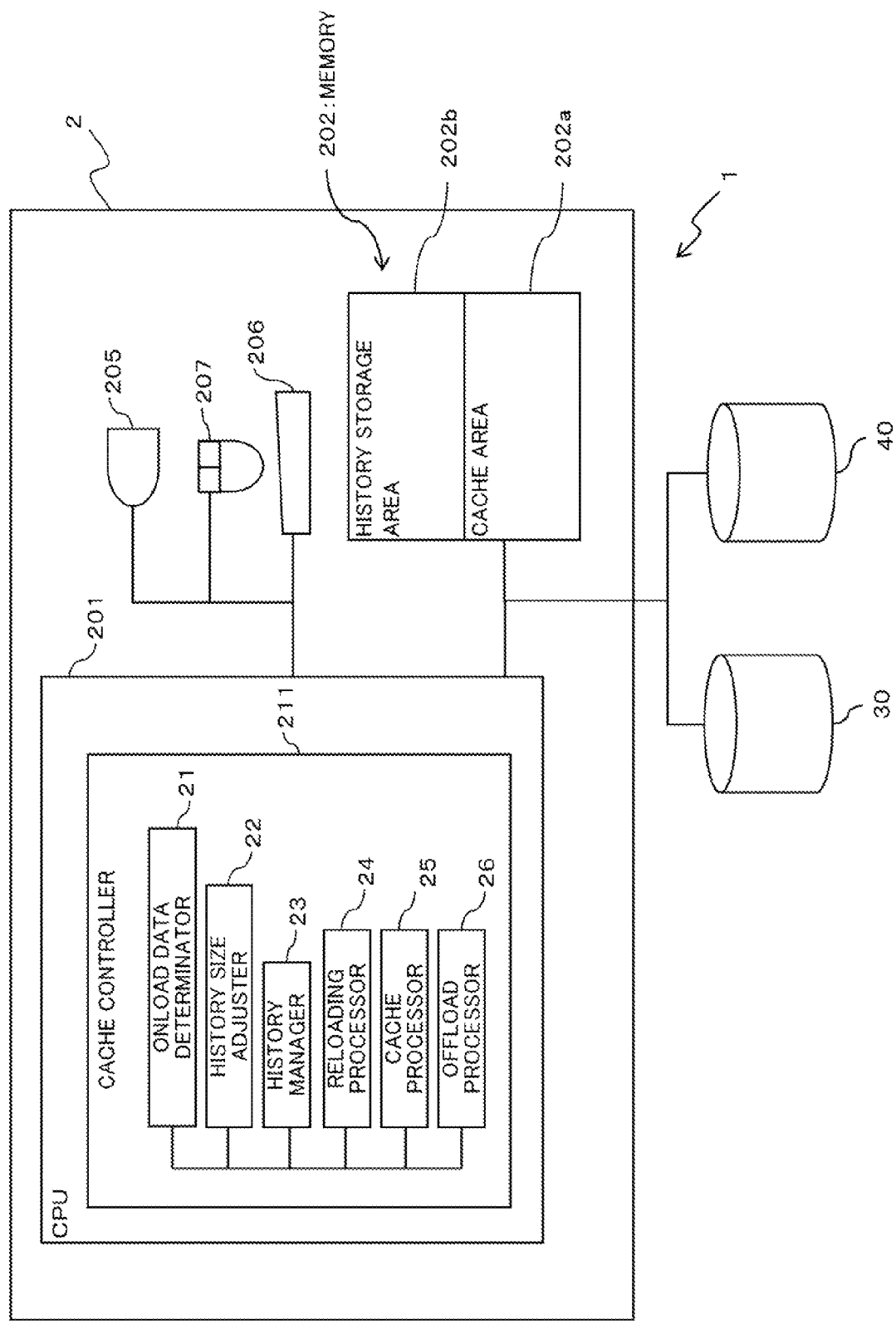
FIG. 1 is a view schematically illustrating a configuration of a storage system according to an example of an embodiment.

FIG. 1 is a view schematically illustrating a configuration of a storage system according to an example of an embodiment.

A storage system 1 according to the present embodiment is connected to one or more upper devices which are not illustrated, and provides storage areas to these upper devices. In addition, the upper device is, for example, a computer (information processing device) which has a server function.

As illustrated in FIG. 1, the storage system 1 has a storage server 2 and a plurality of (two in an example illustrated in FIG. 1) storage devices 30 and 40.

The storage devices 30 and 40 are storage devices such as hard disk drives (HDD) or Solid Stage Drive (SSDs), and store various items of data. The storage areas of these storage devices 30 and 40 are provided to upper devices by the storage server 2.

The storage server 2 is a computer (information processing device) which has a server function, and controls reading and writing of data from and in the storage devices 30 and 40 according to, for example, a request from the upper device. The storage server 2 is, for example, an Intel Architecture (IA) server.

Figure 2:
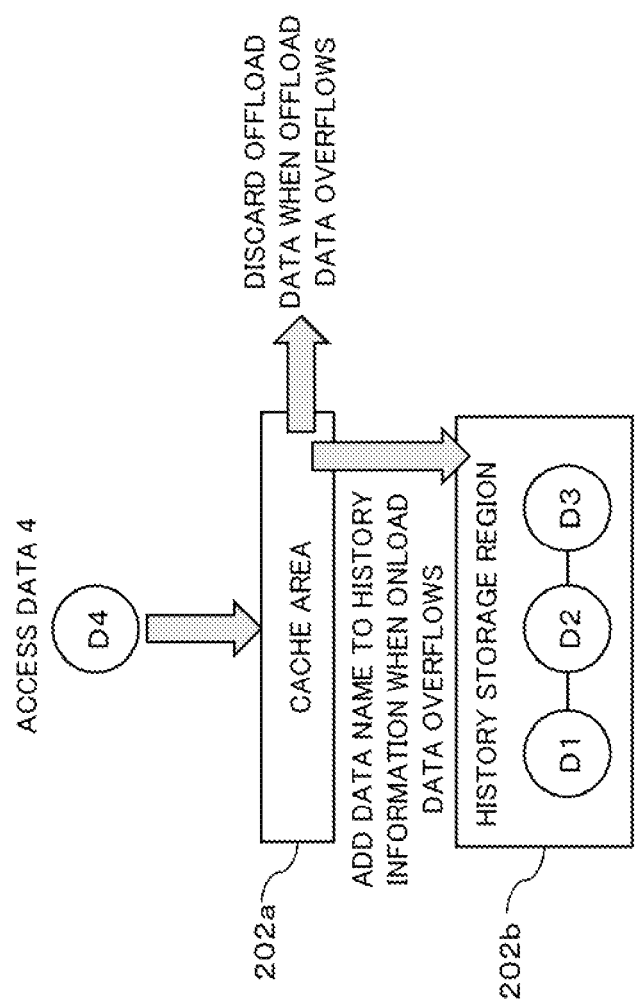
FIG. 2 is a view for explaining a process of a history manager in the storage system according to the example of the embodiment.

As illustrated in FIG. 2, the storage server 2 has a CPU 201, a memory 202, a display 205, a mouse 207 and a keyboard 206.

The display 205 is a display device which displays various pieces of information, and is, for example, a liquid crystal display device or a Cathode Ray Tube (CRT) display device.

The mouse 207 and the keyboard 206 are input devices which are operated by an operator to make various inputs.

The memory 202 is a storage device including a Read Only Memory (ROM) and a Random Access Memory (RAM). In the ROM of the memory 202, software programs related to storage control, and items of data for these programs are written. The software programs on the memory 202 are optionally read and executed by the CPU 201.

Further, the RAM of the memory 202 is used as a primary storage memory or a working memory. The RAM of this memory 202 is a storage device which temporarily stores various items of data and programs, and has a cache area 202a, a history storage area 202b and a memory area which is not illustrated.

Data and a program are temporarily stored and expanded in the memory area when the CPU 201 executes the program. The cache area 202a temporarily stores data received from an upper device and data to be transmitted to an upper device. The cache area 202a temporarily stores data to be written in the storage devices 30 and 40, and data to be read from the storage devices 30 and 40. Hence, the memory 202 has a function of a cache memory. Data is stored and extracted in and from this cache area 202a by a cache processor 25 described later.

In addition, when data is moved between the storage devices 30 and 40, this data to be moved may be temporarily stored in the cache area 202a. In this case, when, for example, data is moved from the storage device 30 to the storage device 40, the data read from the storage device 30 is stored in the cache area 202a once. Further, this data stored in the cache area 202a is subsequently stored in the storage device 40. Data is moved from the storage device 30 to the storage device 40 in this way in an offload data write-back process described later.

Meanwhile, all items of data to be used upon write-back are known to be offload data. Therefore, written offload data may be subjected to so-called optimization without intentionally leaving the offload data which is read or written in the write-back process, in the cache area 202a (bypassing the data through the cache area 202a).

When onload data (second data) described later is pushed out from the cache area 202a, a history storage area (push-out history storage) 202b stores information (e.g. data names) related to onload data as a push-out history.

The CPU 201 is a processing device which performs various types of control and computations, and realizes various functions by executing an Operating System (OS) and programs stored in the memory 202. For example, as illustrated in FIG. 1, the CPU 201 realizes a function of a cache controller 211.

That is, the CPU 201 functions as the cache controller 211 by executing a cache control program.

In addition, this program (cache control program) for realizing the function of the cache controller 211 is provided by being recorded in computer-readable recording media such as flexible disks, CDs (CD-ROMs, CD-Rs, CD-RWs and the like), DVDs (DVD-ROMs, DVD-RAMs, DVD-Rs, DVD+Rs, DVD-RWs, DVD+RWs, HD DVDs and the like), blu-ray disks, magnetic disks, optical disks and optomagnetic disks. Further, a computer reads a program from the recording medium, and transfers and stores the program to and in an internal storage device or an external storage device. Alternatively, this program may be recorded in a storage device (recording medium) such as a magnetic disk, an optical disk or an optomagnetic disk, and provided to the computer through a communication path from this storage device.

A microprocessor (the CPU 201 in the present embodiment) of the computer executes the program stored in the internal storage device (the RAM or the ROM of the memory 202 according to the present embodiment) to realize a function of the cache controller 211. In this case, the computer may read and execute the program recorded in the recording medium.

The cache controller (memory controller) 211 controls writing and reading of data from and in the memory 202. As illustrated in FIG. 1, this cache controller 211 has functions of an onload data determinator 21, a history size adjuster 22, a history manager 23, a reloading processor 24, the cache processor 25 and an offload processor 26.

The offload processor 26 realizes a write off-loading function. According to the write off-loading function, the offload processor 26 writes data once in a data storage area (log area) which is not used in another storage device which is powered on when a write request is made to a storage device which is powered off. Thus, storing data in another storage device different from an original data storage destination storage device is referred to as offload.

Further, data stored in another storage device different from an original data storage destination storage device is referred to as offload data. By contrast with this, data which is not offloaded and needs to be stored in an original data storage destination storage device is referred to as onload data.

Further, according to the write off-loading function, when an original writing destination storage device which is powered off is powered on, offloaded data is written in (written back to) this storage device.

In the storage system 1 illustrated in FIG. 1, a storage device whose data is not accessed for a predetermined period is controlled to be placed in a power off state to reduce power consumption of the storage device, and, for example, the storage device (second storage device) 40 is placed in an power off state.

When a writing request to the storage device 40 in this power off state is made, the offload processor 26 writes data (first data) whose writing destination is this storage device 40, in another storage device (first storage device) 30 in the power on state instead of the storage device 40.

That is, the offload processor (proxy storage processor) 26 performs control of storing offload data (first data) whose writing destination is this storage device 40, in another storage device (first storage device) 30 in a power off state of the storage device (second storage device) 40.

Subsequently, when the original writing destination storage device 40 in the power off state is powered on, the offload processor 26 writes back data offloaded to the storage device 30, to the storage device 40.

That is, the offload processor 26 performs control of moving the offload data (first data) recorded in the storage device 30, to the storage device 40 after powering on the storage device (second storage device) 40.

Thus, the write off-loading function does not need to awaken the storage device 40 even when a write request to the storage device 40 in the power off state is made, and can reduce power consumption. In addition, this write off-loading is a known technique, and therefore will not be described in detail.

The onload data determinator 21 determines whether process target data is onload data or offload data. For example, the onload data determinator 21 determines whether or not data is onload data by referring to management information (not illustrated) for managing identification information (e.g. data names) of data which should be stored in the storage devices 30 and 40. This management information is created and managed based on, for example, an Input/Output (I/O) request received from an upper device.

The cache processor (cache releaser) 25 controls storing and reading of data in and from the cache area 202a of the memory 202, and manages data stored in and outputted from the cache area 202a. This cache processor 25 realizes a known cache replacement algorithm. For example, a Least Recently Used (LRU) algorithm can be used for the cache replacement algorithm.

Further, when an access is made to data offloaded by the above offload processor 26, the cache processor 25 stores this offload data in the cache area 202a of the memory 202.

In this regard, there may be a case where, at a point of time when the offload processor 26 starts write-back, offload data has already been reloaded to the cache area 202a. When, for example, data is written into an offload destination a little before write-back starts, and an access to this data is made, the cache processor 25 stores this offload data in the cache area 202a.

In this case, when another access may be made before write-back starts, even offload data cannot help but being reloaded to the cache area 202a in terms of a cache hit ratio. Thus, offload data loaded to the cache area 202a before write-back of the offload data starts is still loaded to the cache area 202a even though the offload data is optimized as described above, and therefore becomes unnecessary data after the write-back.

Further, the cache processor 25 performs control of deleting offload data from the cache area 202a of the memory 202, too, after the above offload processor (proxy storage processor) 26 writes back the offload data recorded in the storage device 30, to the storage device 40. In addition, deleting offload data from the memory 202 can be realized using various known methods, and therefore will not be described in detail.

Thus, the cache processor 25 deletes offload data from the cache area 202a, so that an empty area is produced in the cache area 202a.

The history manager (push-out history processor) 23 manages onload data pushed out from the cache area 202a of the memory 202, and stores information related to the onload data pushed out from this cache area 202a, in the history storage area 202b of the memory 202. Information related to onload data is information for specifying onload data and is, for example, a data name and an identification number. An example where a data name is used as information related to onload data will be described below. For example, the history storage area 202b adopts a list structure of a variable size which stores data names of onload data.

The history manager 23 stores in the history storage area 202b a data name of onload data pushed out from the cache area 202a. Data names are stored in input order in the history storage area 202b.

Data names of onload data are added to the history storage area 202b when an access to data is made yet a cache miss occurs and data overflows from the cache area 202a, and, as a result, onload data is pushed out. A data name of overflowing onload data is added to a tail of the list structure of the history storage area 202b.

In addition, when offload data overflows from the cache area 202a, the offload data is not registered in the history storage area 202b.

A data name stored in the history storage area 202b will be also referred to as history information below.

FIG. 2 is a view for explaining a process of the history manager 23 in the storage system according to the example of the embodiment. In an example illustrated in this FIG. 2, the cache area 202a is in a state without vacancy (full cache), and data names D1 and D2 are stored in the history storage area 202b in this last state.

In this state, when an upper device makes an access to data of a data name D4 (referred to as data D4 below), the above cache processor 25 stores the data D4 read from the storage device 30, in the cache area 202a.

In this regard, by storing the data D4 in the cache area 202a, data of a data name D3 is pushed out from the cache area 202a instead. When this pushed-out data is onload data, the history manager 23 stores in the history storage area 202b the data name "D3" of the onload data pushed out from this cache area 202a.

In addition, when the data pushed out from the cache area 202a is offload data, a data name thereof is not stored in the history storage area 202b and the data is discarded.

When a cache miss occurs in the cache area 202a upon reception of a read request from an upper device, the history manager 23 performs retrieving in the history storage area 202b based on this read request. That is, the push-out history processor 23 retrieves a data name which is a read request target (read target) received for a data name stored in the history storage area 202b.

Further, when a read target data name is detected in the history storage area 202b, the push-out history processor 23 deletes information related to the second data from this history storage area 202b. The data is data which causes a cache miss, and therefore is read from the storage device 30 or the storage device 40 and then is stored in the cache area 202a. This is because the data does not need to be stored in the history storage area 202b.

The reloading processor 24 reads information (a data name in the present embodiment) related to onload data from the history storage area 202b when an empty area is produced in the cache area 202a, and reads onload data represented by this data name, from the storage device 30. That is, the reloading processor 24 learns the data name of the onload data pushed out from the cache area 202a by referring to the history storage area 202b.

Further, the reloading processor 24 stores the onload data read from this storage device 30, in the cache area 202a of the memory 202. That is, the reloading processor 24 first reads from the storage device 30 the onload data pushed out from the cache area 202a when there is vacancy in the cache area 202a, and reloads the onload to the cache area 202a again.

Further, the reloading processor 24 reads data names stored in the history storage area 202b, in reverse order of the order of data names stored in the history storage area 202b by the history manager 23. That is, the reloading processor 24 reads data names in order of a data name whose elapsed time after the data name is stored in the history storage area 202b is the shortest, from the history storage area 202b.

Further, when the history storage area 202b is full, a data name is pushed out from the history storage area 202b in order of a data name whose elapsed time after the data name is stored in the history storage area 202b is the longest. That is, the reloading processor 24 pushes out data names from the history storage area 202b using the LRU algorithm as the cache replacement algorithm.

In this regard, the cache replacement algorithm used by this reloading processor 24 and the above cache processor 25 is not limited to the LRU algorithm, and may be optionally deformed and implemented. For example, a known ARC (Adaptive Replacement Cache) algorithm may be used instead of the LRU algorithm. In addition, when a plurality of LRU lists is used inside an algorithm such as the ARC algorithm, it is necessary to provide a structure which stores from which list data overflows. By contrast with this, when the above LRU algorithm is used as the cache replacement algorithm, data only needs to be added to the LRU side of a list (queue).

Figure 3:
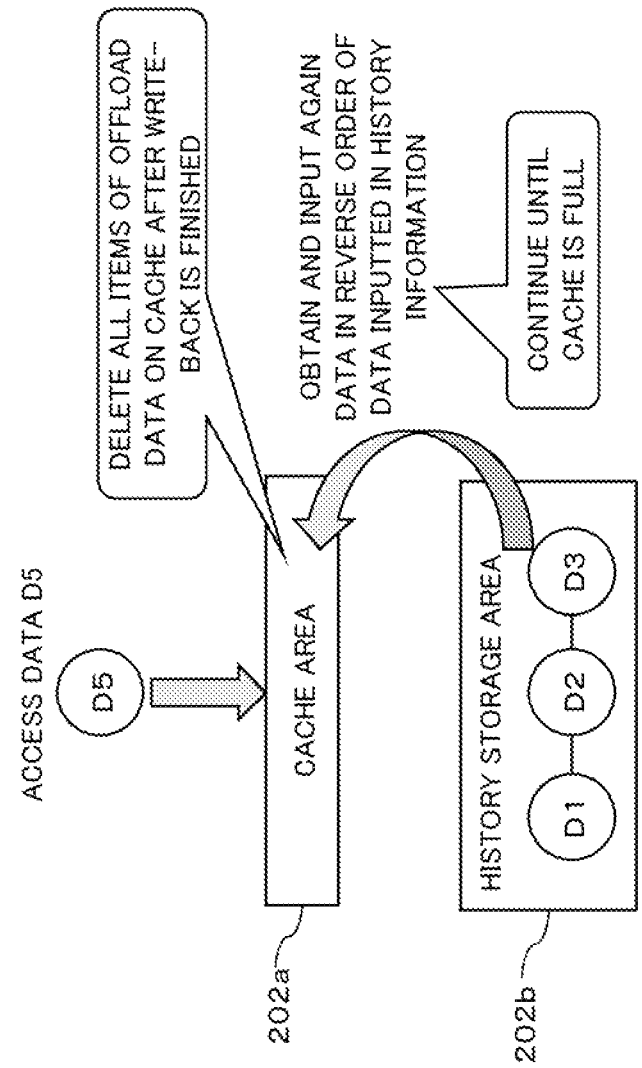
FIG. 3 is a view for explaining a process of a reloading processor in the storage system according to the example of the embodiment.

FIG. 3 is a view for explaining a process of the reloading processor 24 in the storage system according to the example of the embodiment. In the example illustrated in this FIG. 3, there is vacancy in the cache area 202a, and data names D1, D2 and D3 are stored in the history storage area 202b. These names are stored in the history storage area 202b in order of the data names D1, D2 and D3, and the data name D3 is at the tail of the list structure.

As described above, the cache processor 25 deletes offload data whose write-back to the storage device 40 is finished, from the cache area 202a, so that an empty area is produced in the cache area 202a.

When there is vacancy produced in the cache area 202a, the reloading processor 24 reads a (tail) data name whose elapsed time after the data name is stored is the shortest, from the history storage area 202b, and reads onload data specified based on this data name, from the storage device 30. Further, the reloading processor 24 reloads the read onload data to the cache area 202a.

In the example illustrated in FIG. 3, the reloading processor 24 reads the data name D3 from the history storage area 202b, reads data indicated by this data D3 from the storage device 30, and stores the data in the cache area 202a.

Further, the reloading processor 24 repeats reading data names from the history storage area 202b, and reading onload data specified based on these data names from the storage device 30 and storing the onload data in the cache area 202a until the cache area 202a is full.

Furthermore, this reloading processor 24 performs a process of reloading onload data to the cache area 202a, in a state of a low I/O load on the storage device 30 so as not to bother users' experiences. The I/O load can be determined by, for example, referring to a value of a disk busy rate or an IOPS (Input Output Per Second).

The above reload process is stopped when an area which is made vacant by deleting offload data in the cache area 202a is full due to addition of data caused by a cache miss of an access from a user and addition of data from the history storage area 202b by the reloading function.

The history size adjuster 22 changes a size of the history storage area 202b according to a data size of offload data in the cache area 202a. More specifically, the history size adjuster 22 adjusts the size of the history storage area 202b according to the number of items of offload data in the cache area 202a.

The history size adjuster 22 performs control such that the number of data names of onload data in the history storage area 202b matches with the number of items of offload data in the cache area 202a. It is assumed that data is stored and read in and from the cache area 202a in predetermined size units.

The data amount which can be written back to the cache area 202a is a data amount of offload data stored in the cache area 202a at maximum, and managing more items of data than the data amount in the history storage area 202b is wasteful. Hence, in the storage system 1, the history size adjuster 22 makes adjustment such that the size (the number of data names to be stored) of the history storage area 202b matches with the number of items of offload data in the cache area 202a.

The history size adjuster 22 obtains from the cache processor 25 information as to what is inputted in the cache area 202a as a result of an I/O request from a user and what is outputted as a result of the cache replacement algorithm.

Figure 6:
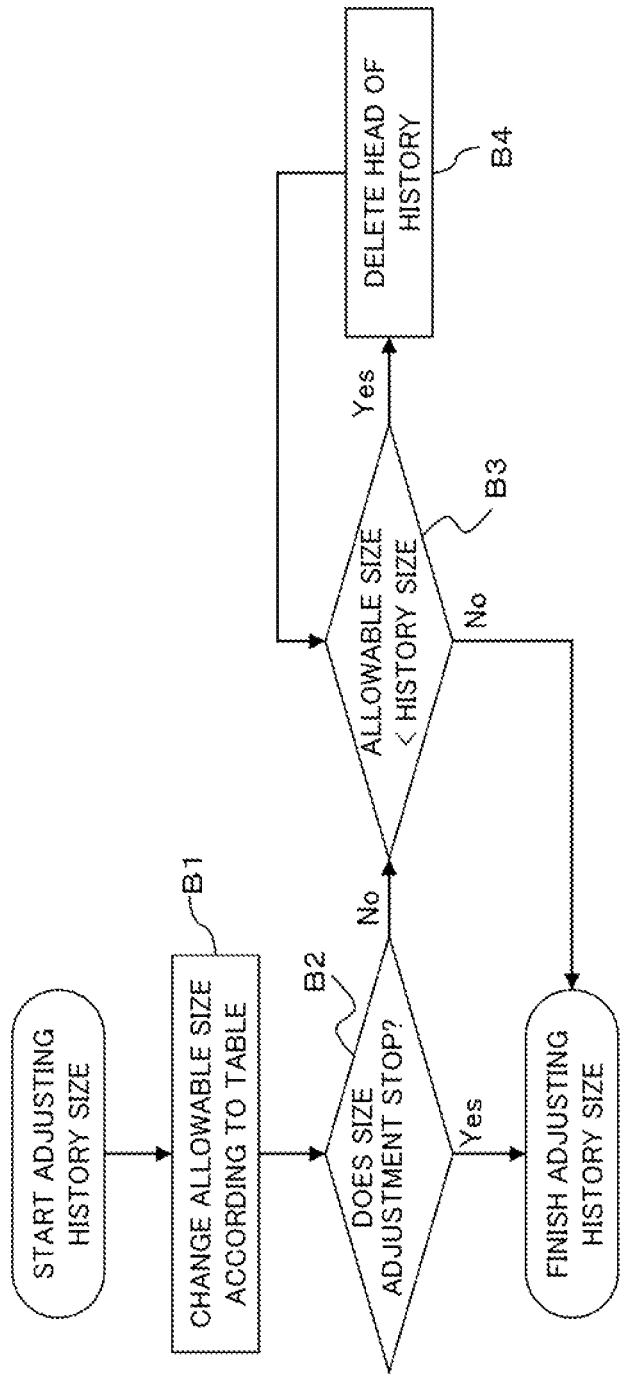
FIG. 6 is a flowchart for explaining a method of changing a size of a history storage area in the storage system according to the example of the embodiment.
Figure 8:
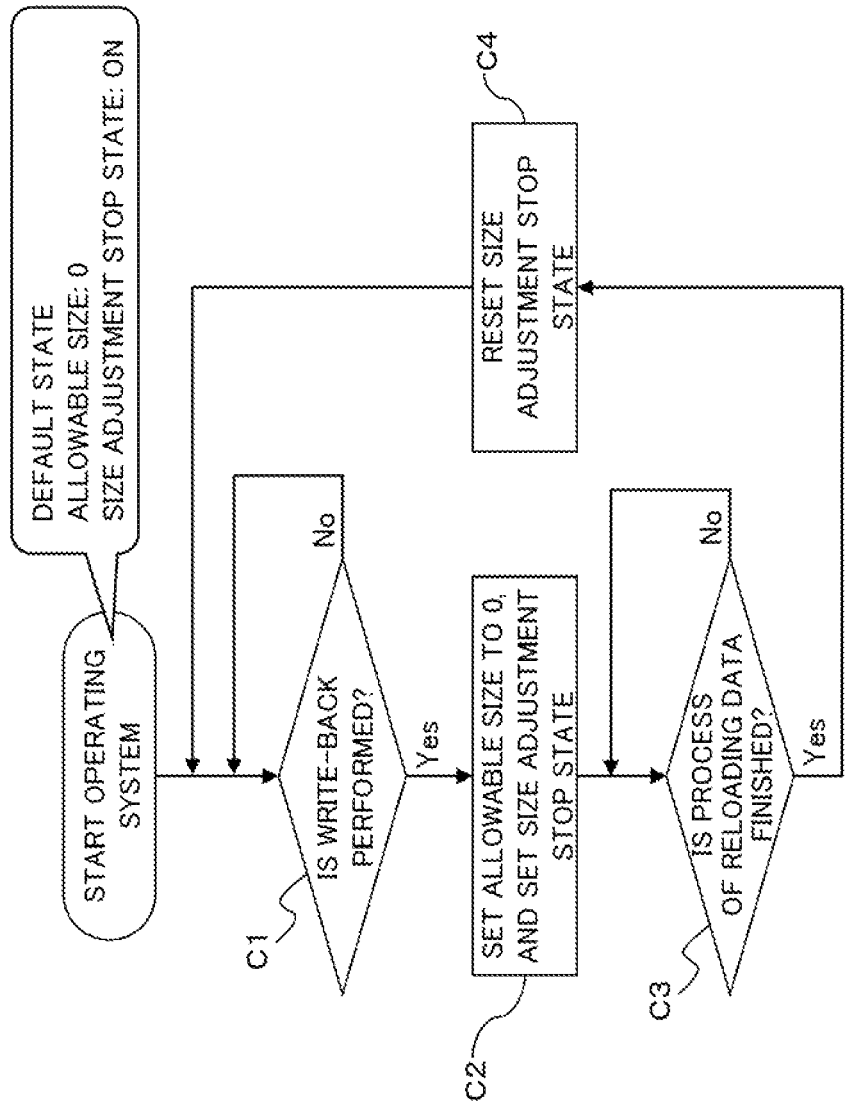
FIG. 8 is a flowchart for explaining a method of setting a stop state of a size adjusting function of the storage system according to the example of the embodiment.

In addition, a process method of adjusting a size of the history storage area 202b in this history size adjuster 22 will be described later in detail with reference to FIGS. 6 to 8.

Figure 4:
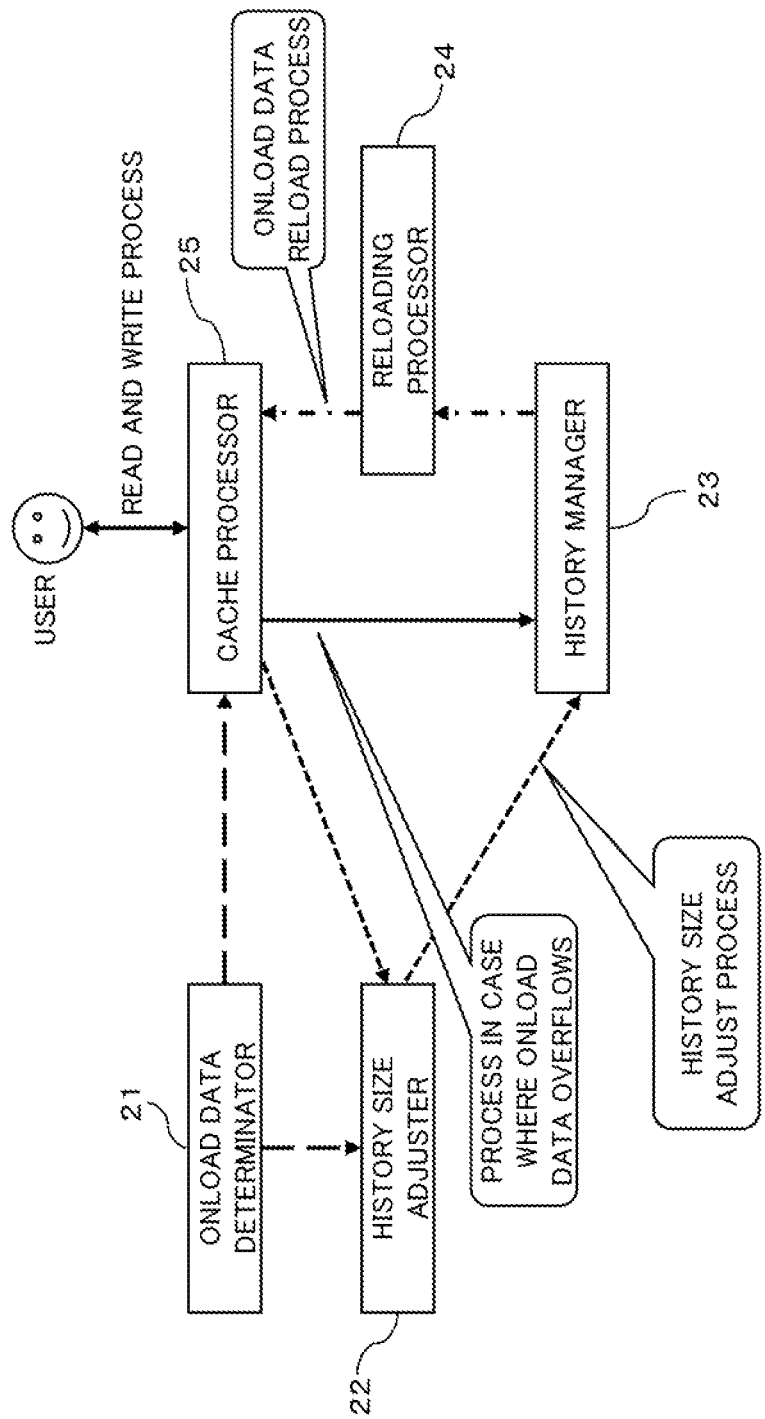
FIG. 4 is a view illustrating a relationship between respective functional components in the storage system according to the example of the embodiment.

FIG. 4 is a view illustrating a relationship between functional components in the storage system 1 according to the example of the embodiment.

For example, the cache processor 25 performs control of storing data read from the storage device 30 and data to be written in the storage device 30, in the cache area 202a in response to a data read/write request inputted from a user. Further, following the control, the cache processor 25 then performs control of pushing out data from the cache area 202a using the cache replacement algorithm.

Furthermore, the cache processor 25 deletes offload data whose write-back to the storage device 40 is finished, from the cache area 202a. By this means, an empty area is produced in the cache area 202a.

The onload data determinator 21 determines whether data pushed out from the cache area 202a is onload data or offload data instead of that the cache processor 25 stores data in the cache area 202a.

When the data pushed out from the cache area 202a of the memory 202 is onload data, the history manager 23 stores in the history storage area 202b a data name of the onload data pushed out from this cache area 202a.

When the empty area is produced in the cache area 202a, the reloading processor 24 reads a data name whose elapsed time after the data name is stored is the shortest from this history storage area 202b, and reads onload data specified based on this data name, from the storage device 30. Further, the reloading processor 24 reloads the read onload data to the cache area 202a. That is, the reloading processor 24 performs the process of reloading the onload data.

The history size adjuster 22 adjusts the size of the history storage area 202b by performing control such that the number of items of offload data in the storage area 202b matches with the number of items of offload data in the cache area 202a.

Figure 5:
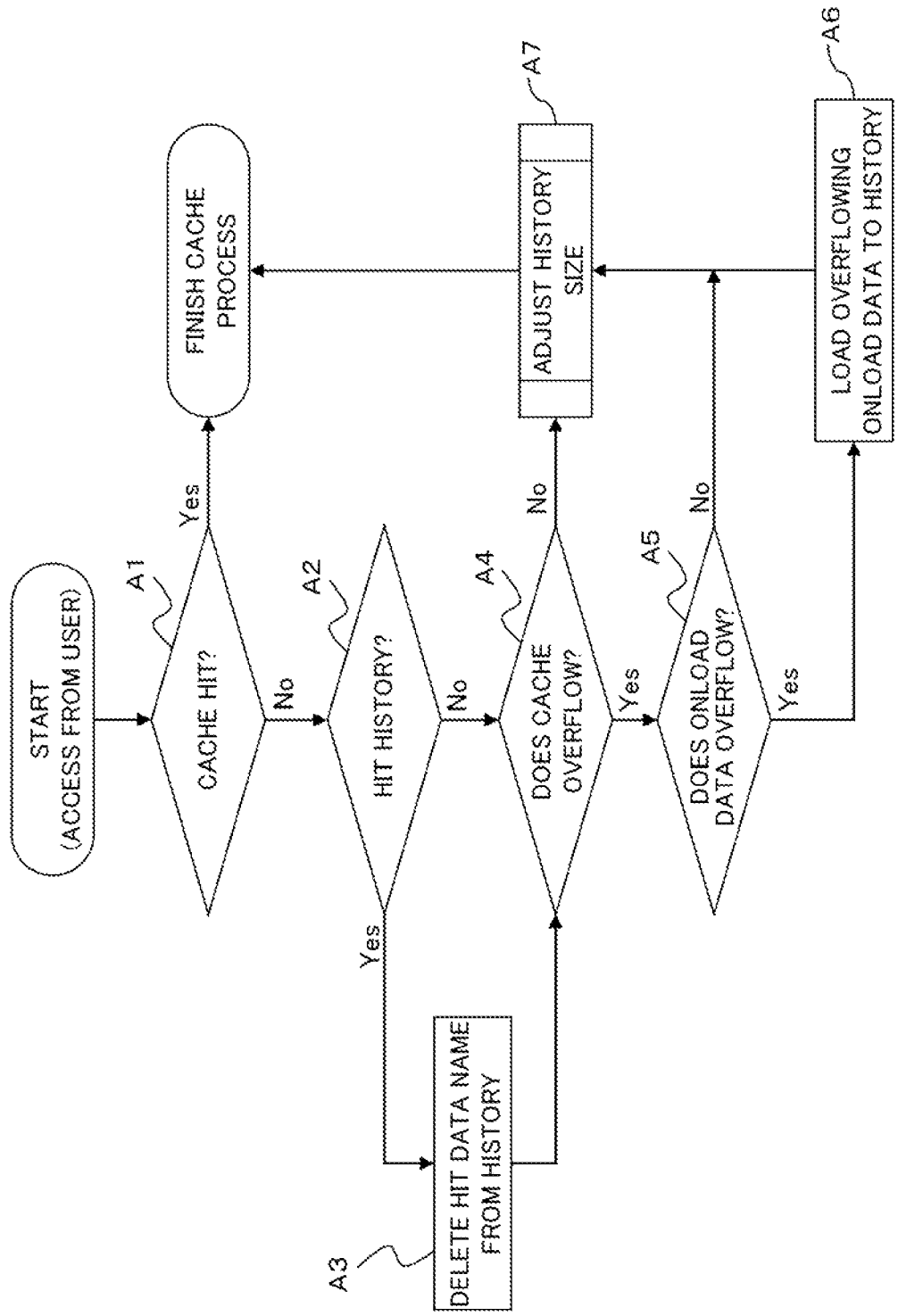
FIG. 5 is a flowchart for explaining an outline of a cache process when a user makes an I/O access in the storage system according to the example of the embodiment.

An outline of a cache process in case where a user makes an I/O access in the storage system 1 according to the example of the embodiment employing the above configuration will be described according to a flowchart (steps A1 to A7) illustrated in FIG. 5.

When the user makes an I/O access in the storage system 1, in step A1, the cache processor 25 determines whether or not there is a cache hit in the cache area 202a using the cache replacement algorithm. When there is a cache hit (see Yes route in step A1), this hit data is returned to the user and the process is finished.

When there is not a cache hit, i.e., when a cache miss occurs (see No route in step A1), in step A2, whether or not a data name of I/O-requested data is included in history information of the history storage area 202b is checked.

When a data name of the I/O-requested data is not stored in the history storage area 202b (there is not a hit) (No route in step A2), the flow moves to step A4.

Further, when the data name of the I/O-requested data is stored in the history storage area 202b (see Yes route in step A2), in step A3, the history manager 23 deletes the hit data name from the history storage area 202b. By this means, it is guaranteed that each data (data body) of a data name included in history information is onload data which is not loaded to the cache area 202a. Then, the flow moves to step A4.

In step A4, whether or not there is data which overflows from the cache area 202a is checked.

When a cache miss occurs in the cache area 202a, if the cache area 202a is full, storing data additionally read from the storage device 30, in the cache area 202a overflows data from the cache area 202a.

When there is not data which overflows from the cache area 202a (see No route in step A4), in step A7, the history size adjuster 22 adjusts the size of the history storage area 202b (history size adjustment), and then the process is finished. The history size adjust process will be described later with reference to FIGS. 6 to 8.

Meanwhile, when there is data which overflows from the cache area 202a (see Yes route in step A4), in step A5, the onload data determinator 21 determines whether or not the overflowing data is onload data.

When the data which overflows from the cache area 202a is onload data (see Yes route in step A5), this onload data is likely to be reloaded to the cache area 202a in future. Then, in step A6, the history manager 23 adds a data name of onload data which overflows from the cache area 202a, to the tail of the history storage area 202b. Then, the flow moves to step A7. Further, when data which overflows from the cache area 202a is not onload data, either (see No route in step A5), the flow moves to step A7.

Next, a method of changing a size of the history storage area 202b in the storage system 1 according to the example of the embodiment will be described with reference to FIG. 7 and according to a flowchart (steps B1 to B4) illustrated in FIG. 6. FIG. 7 is a view illustrating in a table format an algorithm of calculating a variable "allowable size" used by the history size adjuster 22 of the storage system 1 according to the example of the embodiment.

The history size adjuster 22 calculates a value of the variable "allowable size" using, for example, the calculation algorithm illustrated in FIG. 7. As described later, the history size adjuster 22 changes the number of data names of onload data to be stored in the history storage area 202b, i.e., the size (history size) of the history storage area 202b using this value of the allowable size.

When a cache miss occurs in the cache area 202a and data is stored in the cache area 202a in response to a subsequent I/O request, the history size adjuster 22 changes the value of the variable "allowable size" using the calculation algorithm illustrated in FIG. 7 (step B1).

More specifically, in an example illustrated in this FIG. 7, when onload data is inputted to the cache area 202a and offload data is pushed out from the cache area 202a instead, the value of the allowable size is subtracted (−1). Meanwhile, when offload data is inputted to the cache area 202a and onload data is pushed out from the cache area 202a instead, the value of the allowable size is added (+1).

Further, when offload data is inputted to the cache area 202a and there is not data pushed out from the cache area 202a instead, too, the value of the allowable size is added (+1). This corresponds to, for example, that there is vacancy in the cache area 202a right after activation, and that all items of offload data on the cache area 202a are deleted in accordance with the finish of the write-back of the offload data and there is not vacancy in the cache area 202a, and therefore the cache processor 25 pushes out no data.

In addition, in cases other than these cases, a value of an allowable size is not changed.

The history size adjuster 22 changes an allowable size by applying the above calculation algorithm based on a result of an input and an output to and from the cache area 202a obtained from the cache processor 25.

In step B2, whether or not a stop state of the size adjusting function is checked. More specifically, the history size adjuster 22 checks whether or not information (e.g. flag) indicating a stop state of the size adjusting function described later is set.

When the size adjusting function is in the stop state (see Yes route in step B2), the process is finished.

Meanwhile, when a stop state of the size adjusting function is canceled (see No route in step B2), in step B3, the history size adjuster 22 compares the number of data names of offload data stored in the history storage area 202b, i.e., a history size, and a value of an allowable size.

When the history size is larger than the allowable size as a result of this comparison (see Yes route in step B3), in step B4, the history size adjuster 22 deletes a head data name, i.e., a data name whose elapsed time after the data name is stored is the longest among the data names stored in the history storage area 202b. By this means, the history size is subtracted (−1). Then, the flow returns to step B3. Hence, when an actual size of the history storage area 202b, i.e., the number of items of data in the history storage area 202b is larger than the allowable size, data names are deleted from the head of the history storage area 202b until the number of items of data reaches the allowable size.

When the history size is the allowable size or less (see No route in step B3), the process is finished.

Next, a method of setting the stop state of the size adjusting function illustrated in step B2 in FIG. 6 will be described with reference to the flowchart (steps C1 to C4) illustrated in FIG. 8.

Upon start of an operation such as activation of the storage system 1, 0 is set to the value of the variable "allowable size" as a default state, and the stop state of the size adjusting function is set.

In step C1, the history size adjuster 22 checks whether or not the offload processor 26 writes back offload data to the write-back destination storage device 40.

When offload data is not written back as a result of this check (see No route in step C1), the flow returns to step C1, and a check process in step C1 is repeatedly executed until data is written back.

When offload data is written back (see Yes route in step C1), in step C2, the history size adjuster 22 sets 0 to a value of the allowable size and sets information indicating a stop state of the size adjusting function. More specifically, the history size adjuster 22 sets a flag or the like indicating the stop state of the size adjusting function to an area or the like of the memory 202 which is not illustrated.

That is, immediately after offload data is written back, the size adjusting function of the history storage area 202b is temporarily stopped. By this means, all data names of onload data of the history storage area 202b are prevented from being deleted (the size is prevented from being set to 0) to meet the number of items of offload data whose number of items becomes zero in the cache area 202a due to the write-back.

Subsequently, in step C3, the history size adjuster 22 checks whether or not the reloading processor 24 finishes the process of reloading onload data to the cache area 202a. When this reloading processor 24 does not finish the reload process (see No route in step C3), the flow returns to step C3, and the check process in step C3 is repeated until the reload process is finished.

When the reload process is finished (see Yes route in step C3), a size adjustment state which is set to the stop state in step C2 is cancelled in step C4.

Hence, it can be said that the size adjustment stop state indicates a state where the reloading processor 24 executes a process of reloading onload data to the cache area 202a.

Next, the process of reloading onload data to the cache area 202a in the reloading processor 24 of the storage system 1 according to the example of the embodiment will be described with reference to the flowchart (steps D11 to D13) illustrated in FIG. 9.

The process of reloading onload data to the cache area 202a in the reloading processor 24 is started when the above offload processor 26 finishes the process of writing back offload data.

In step D11, the reloading processor 24 checks whether the cache area 202a of the memory 202 is full. When there is vacancy in the cache area 202a (see No route in step D11), in step D12, the reloading processor 24 checks whether there is vacancy in the history storage area 202b.

When there is not vacancy in the history storage area 202b (see No route in step D12), in step D13, the reloading processor 24 performs the reload process at a timing when the I/O load on the storage device 30 is low. That is, the reloading processor 24 extracts the tail data name from the history storage area 202b, reads the onload data corresponding to this data name from the storage device 30, and stores the onload data in the cache area 202a. Subsequently, the flow returns to step D11.

Meanwhile, when the cache area 202a is full (see Yes route in step D11) or when there is vacancy in the history storage area 202b (see Yes route in step D12), the process is finished.

Thus, in the storage system 1 according to the example of the embodiment, the offload processor 26 writes back the offload data in the cache area 202a, to the storage device 40, and then the reloading processor 24 stores onload data in an empty area which is produced in the cache area 202a. Consequently, it is possible to effectively use the cache area 202a.

Further, the history storage area 202b is provided in the memory 202, and a data name of onload data which overflows from the cache area 202a upon an I/O request process is stored in this history storage area 202b. Furthermore, the reloading processor 24 reads data regarding the data name read from this history storage area 202b, from the storage device 30, and stores the data in the cache area 202a. Consequently, it is possible to improve the hit ratio of the cache area 202a.

The history manager 23 stores the data name of the onload data which overflows from the cache area 202a, at a tail of the history storage area 202b, and the reloading processor 24 preferentially reloads the data of this data name at the tail, to the cache area 202a.

When data which overflows from the cache area 202a is onload data, this onload data is likely to be reloaded to the cache area 202a in future, and a high-speed access to this onload data can be made by performing retrieving in the history storage area 202b.

Further, the reloading processor 24 sequentially selects a data name which is stored last among data names stored in the history storage area 202b, reads data regarding the data name from the storage device 30, and stores the data in the cache area 202a. Consequently, it is possible to improve a cache hit ratio with respect to onload data.

Further, more specifically, the history size adjuster 22 adjusts the size of the history storage area 202b to meet the number of items of offload data in the cache area 202a. More specifically, the history size adjuster 22 makes the adjustment such that the size (the number of data names to be stored) of the history storage area 202b matches with the number of items of offload data in the cache area 202a. Consequently, it is possible to suppress the size of the history storage area 202b at a minimum, and effectively use the memory 202.

Further, the history size adjuster 22 preferentially deletes a head data name in the history storage area 202b to reduce the size of the history storage area 202b. Furthermore, when an access to data of the data name included in the history storage area 202b, the history size adjuster 22 deletes this data name from the history storage area 202b. Consequently, it is possible to guarantee that data of data names in the history storage area 202b is onload data which is not loaded to the cache area 202a, and efficiently use the memory 202.

Further, the disclosed technique is not limited to the above embodiment, and can be variously modified and carried out without departing from the spirit of the present embodiment. Each configuration and each process according to the present embodiment can be taken and left when necessary, or may be optionally combined.

Further, one of ordinary skill in the art can carry out and manufacture the present embodiment based on the above disclosure.

According to one embodiment, it is possible to efficiently use a cache memory.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage apparatus comprising:
   a first storage device that stores data;
   a proxy storage processor that records first data in the first storage device in a power-off state of a second storage device, a writing destination of the first data being the second storage device, and moves the first data to the second storage device after the second storage device is powered on, the first data being recorded in the first storage device;
   a cache releaser that deletes the first data from a cache memory after the proxy storage processor stores the first data in the second storage device, the first data being recorded in the first storage device;
   a push-out history processor that, when second data is pushed out from the cache memory, stores information related to the pushed-out second data in a push-out history storage, a writing destination of the second data being the first storage device; and
   a reloading processor that, when there is an empty area in the cache memory, reads the information related to the pushed-out second data from the push-out history storage, and stores the second data in the cache memory, the second data being read from the first storage device based on the information related to the second data.

2. The storage apparatus according to claim 1, further comprising a push-out history storage area adjuster that changes a storage area size of the push-out history storage according to a size of the first data in the cache memory.

3. The storage apparatus according to claim 1, wherein the push-out history processor performs retrieving in the push-out history storage based on a read request when a cache miss occurs in the cache memory upon reception of the read request, and deletes the information related to the second data, from the push-out history storage when detecting the information related to the second data regarding to the read request in the push-out history storage.

4. A cache control method comprising:
   recording first data in a first storage device in a power-off state of a second storage device, a writing destination of the first data being the second storage device, and moving the first data to the second storage device after the second storage device is powered on, the first data being recorded in the first storage device;
   deleting the first data from a cache memory after storing the first data in the second storage device, the first data being recorded in the first storage device;
   when second data is pushed out from the cache memory, storing information related to the pushed-out second data in a push-out history storage, a writing destination of the second data being the first storage device; and
   when there is an empty area in the cache memory, reading the information related to the pushed-out second data from the push-out history storage, and storing the second data in the cache memory, the second data being read from the first storage device based on the information related to the second data.

5. The cache control method according to claim 4, further comprising changing a storage area size of the push-out history storage according to a size of the first data in the cache memory.

6. The cache control method according to claim 4, further comprising performing retrieving in the push-out history storage based on a read request when a cache miss occurs in the cache memory upon reception of the read request, and deleting the information related to the second data, from the push-out history storage when detecting the information related to the second data regarding to the read request in the push-out history storage.

7. A non-transitory computer-readable recording medium having recorded thereon a cache control program causing a computer to execute a process comprising:
   recording first data in a first storage device in a power-off state of a second storage device, a writing destination of the first data being the second storage device, and moving the first data to the second storage device after the second storage device is powered on, the first data being recorded in the first storage device;
   deleting the first data from a cache memory after storing the first data in the second storage device, the first data being recorded in the first storage device;
   when second data is pushed out from the cache memory, storing information related to the pushed-out second data in a push-out history storage, a writing destination of the second data being the first storage device; and
   when there is an empty area in the cache memory, reading the information related to the pushed-out second data from the push-out history storage, and storing the second data in the cache memory, the second data being read from the first storage device based on the information related to the second data.

8. The non-transitory computer-readable recording medium according to claim 7 having recorded thereon the cache control program causing the computer to execute a process comprising changing a storage area size of the push-out history storage according to a size of the first data in the cache memory.

9. The non-transitory computer-readable recording medium according to claim 7 having recorded thereon the cache control program causing the computer to execute a process comprising performing retrieving in the push-out history storage based on a read request when a cache miss occurs in the cache memory upon reception of the read request, and deleting the information related to the second data, from the push-out history storage when detecting the information related to the second data regarding to the read request in the push-out history storage.

* * * * *